UNITED STATES PATENT OFFICE.

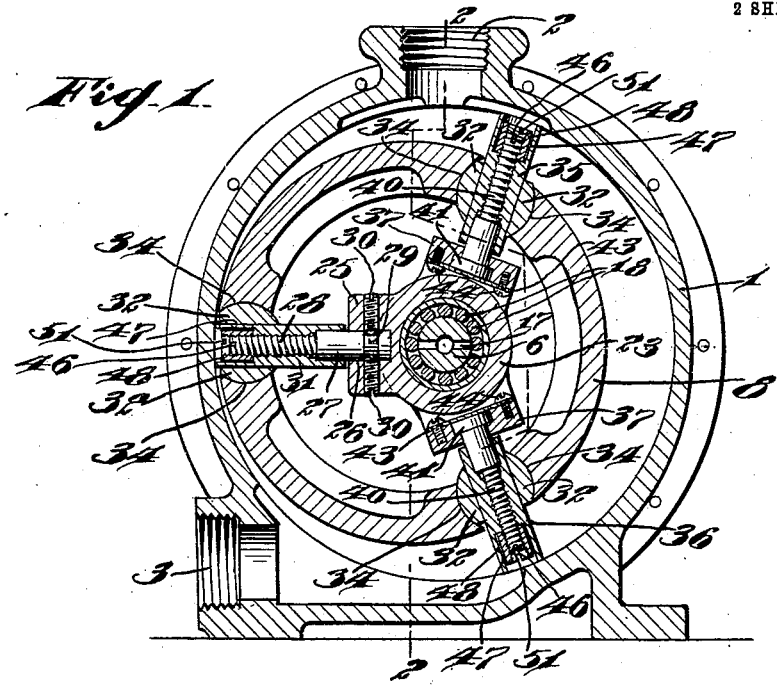

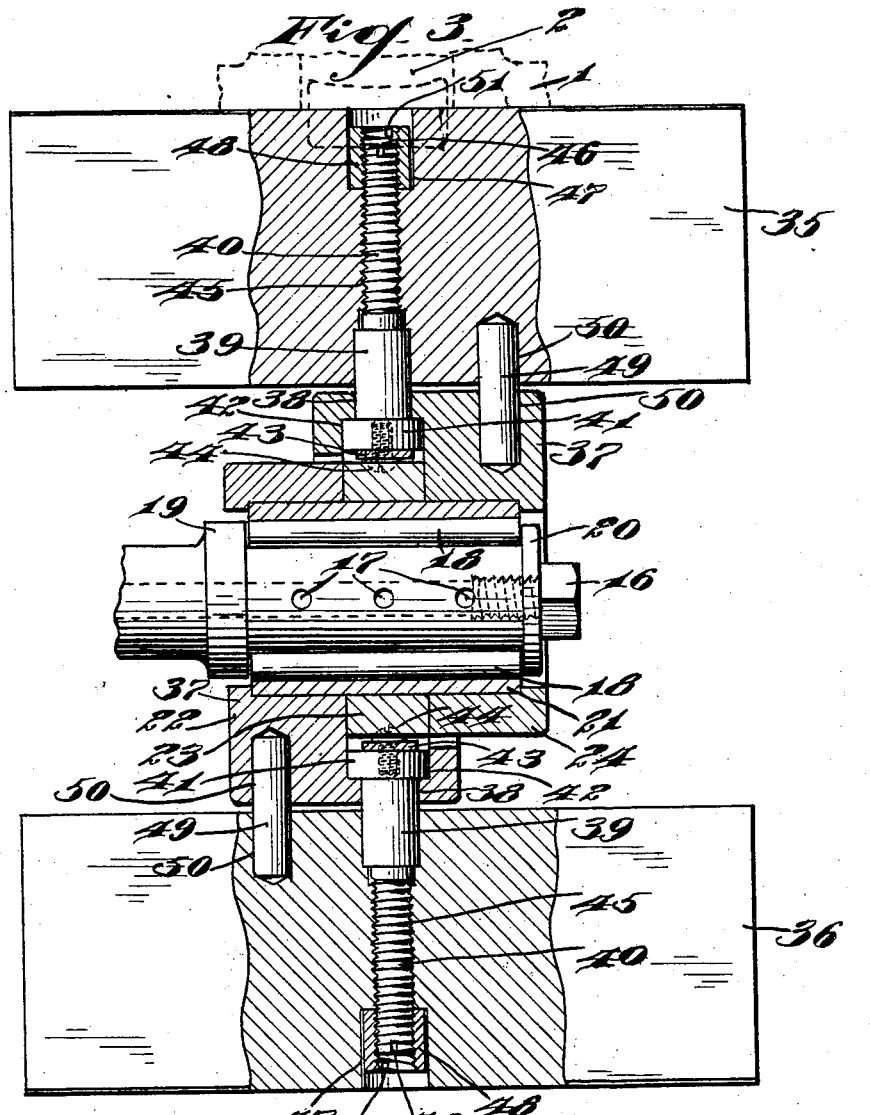

ARTHUR H. SQUIER, OF PHILADELPHIA, PENNSYLVANIA, ASSIGNOR TO THE AIR CLEANER COMPANY, OF PHILADELPHIA, PENNSYLVANIA, A CORPORATION OF PENNSYLVANIA.

VACUUM-PUMP.

977,338.  Specification of Letters Patent.  Patented Nov. 29, 1910.

Application filed January 8, 1910. Serial No. 536,968.

*To all whom it may concern:*

Be it known that I, ARTHUR H. SQUIER, a citizen of the United States, residing at Philadelphia, in the county of Philadelphia and State of Pennsylvania, have invented certain new and useful Improvements in Vacuum-Pumps, of which the following is a specification.

My invention relates to improvements in vacuum pumps, the object of the invention being to provide an improved arrangement of blades or vanes with an improved arrangement and mounting for adjustable rods, supporting the vanes, said rods being located centrally in the casing and in line with the inlet to the casing, so that a screw driver, or similar device, may be inserted through said inlet, and adjust the vanes radially, to properly engage the casing and insure a perfect suction after the vanes become worn.

With these and other objects in view, the invention consists in certain novel features of construction and combinations and arrangements of parts, as will be more fully hereinafter described and pointed out in the claims.

In the accompanying drawings: Figure 1 is a view in cross section through the center of the pump illustrating my improvements. Fig. 2 is a view in longitudinal section on the line 2—2 of Fig. 1. Fig. 3 is an enlarged view partly in section of the vanes showing the connection between two of the vanes and the rings supporting them, and Figs. 4 and 5 are views in elevation of the two forms of adjusting rods employed.

1 represents the cylindrical casing of my improved pump, having an inlet 2 and an outlet 3, and inclosed at its ends by heads 4 and 5 respectively. A hollow stationary shaft 6 is secured in an opening in the head 4 by means of a nut 7, screwed on to the externally threaded end of shaft 6, and a screw plug 8ª normally closes the internally screwthreaded end of said shaft.

8 represents an inner cylinder, which is supported eccentrically within casing 1, and is made with angular and annular recesses 9, at its ends, which conform to the shape of the heads 4 and 5, and form in effect, stepped bearings for the ends of the cylinder 8. One of said ends, illustrated at 10, is removable, and secured by screws 11 to the cylinder 8, and mounted to turn on roller bearings 12 around an enlargement 13 on head 4. The opposite end of cylinder 8 is secured to a driving shaft 14, around which roller bearings 15 are provided, so that the cylinder 8 has roller bearings at both ends, insuring an easy running device.

The hollow shaft 6, above referred to, is mounted concentrically within casing 1 and projects into cylinder 8, said hollow shaft 6 being inclosed at its inner end by plug 16, and perforations 17 are provided in the shaft, to permit lubricant, which is poured into the shaft from the outside, to flow out against roller bearings 18 around the shaft, said roller bearings being confined between an enlargement 19 on the shaft and a disk or washer 20 held on the shaft by means of the plug 16. A wearing ring or sleeve 21 is located around and mounted on the roller bearings 18, and on this sleeve 21 my improved rings 22, 23, and 24 are located centrally. The ring 23 is located between rings 22 and 24 and provided with an enlargement 25 at one side, having a radial recess 26 to receive the enlarged, smooth inner end 27 of the adjusting rod 28. This smooth inner end 27 is made with an annular groove 29 into which screws 30 in the enlargement 25 project so as to prevent any longitudinal movement of the rod. The rod 28, which is externally screw threaded throughout the greater portion of its length, is located in, and in mesh with, screw threads in a radial opening in a blade or vane 31, which latter projects between curved bearing strips 32, located in the curved walls 34, of longitudinal slots in the cylinder 8, to permit of the necessary pivotal movement of the blade or vane, and all three of the blades or vanes indicated by characters 31, 35 and 36 are so mounted.

The rings 22 and 24 are made with offset portions 37, projecting across ring 23, and these offset portions 37 are made with openings 38 to accommodate the enlarged smooth inner ends 39 of rods 40. The said inner ends 39 of rods 40 have disks or enlargements 41 thereon, located in recesses 42 and held therein by cross strips 43, said cross strips being secured by screws 44 to prevent longitudinal movement of rods 40. The rods 40, like rod 28, are externally screw threaded and meshed with screw threads in radial openings 45 in the vanes 35 and 36. The outer ends of all of said rods are made with screw driver receiving recesses 46, and the blades or vanes are made with enlarged recesses 47 to accommodate jam nuts or rings 48, around the rods, to secure them against accidental movement.

49 represents dowel pins, which are inserted in alined recesses 50 in the blades or vanes, and the rings, respectively, so as to prevent any turning movement of the blades or vanes on their adjusting rods.

All of said adjusting rods are located in the same plane at the center of the casing, and in line with the inlet opening 2, so that when the casing 8 is turned, each of said rods may be positioned in line with the inlet 2 and a screw driver can be inserted through said inlet, to turn the rod and adjust the blade or vane radially, so as to secure the desired engagement with the inner face of casing 1. It will thus be noted that as the blades wear in use, they can be readily adjusted without removing the heads of the cylinder, and this adjustment can be accomplished by anyone of average intelligence, not requiring the work of a skilled mechanic. To adjust the vanes, the jam nuts or rings 48 are first unscrewed, recesses 51 being provided in said nuts or rings for the accommodation of a screw driver to turn them, and after the nuts are loosened, the rods may be turned, and such turning of the rods will move the blades radially. When the desired adjustment is had the nuts 48 are screwed home to jam the rods and prevent accidental movement.

The operation of the device is as follows: Shaft 14 is revolved, which causes cylinder 8 to revolve and the latter, as above stated, is mounted eccentrically in the casing. As cylinder 8 revolves, the blades or vanes 31, 35 and 36 are moved and turn concentrically with the casing, that is, they are connected to rings which turn about the shaft 6, which latter is mounted concentrically within the casing, so that the outer edges of the blades or vanes remain in close contact with the inner face of the casing 1, and draw air through inlet 2 and force it out through outlet 3.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention what I claim as new and desire to secure by Letters Patent is:

1. In a device of the character described, the combination with a casing, a shaft mounted concentrically in the casing, a cylinder mounted eccentrically in said casing, a shaft secured to and adapted to turn said cylinder, a series of radially disposed blades or vanes mounted in the cylinder and having their outer edges engaging the inner face of the cylinder, rings on said first mentioned shaft, screw threaded rods connected to said rings and having threaded engagement with said vanes, all of said rods being in the same plane and all of them having screw driver receiving grooves in their outer ends located in recesses in the edges of the blades or vanes.

2. In a device of the character described, the combination with a casing, of a shaft mounted concentrically in the casing, a cylinder mounted eccentrically in said casing, a shaft secured to and adapted to turn said cylinder, a series of radially disposed blades or vanes mounted in the cylinder and having their outer edges engaging the inner face of the cylinder, rings on said first mentioned shaft, screw threaded rods connected to said rings and having threaded engagement with said vanes, all of said rods being in the same plane and all of them having screw driver receiving grooves in their outer ends located in recesses in the edges of the blades or vanes, and said casing having inlet and outlet ports located in the same plane as the rods, and one of said ports disposed radially whereby a screw-driver may be inserted through said radial port to turn the rods and adjust the vanes.

3. In a device of the character described, the combination with a cylindrical casing, of a fixed shaft mounted concentrically in the casing, a cylinder mounted eccentrically in the casing, means for turning said cylinder, said cylinder having longitudinal openings, three blades or vanes located in said openings in the cylinder and engaging the inner face of the casing, three rings around the shaft, the outer rings having extensions projecting over the middle ring, rods having rotary mounting in said rings and screw threaded throughout the greater portion of their length, said vanes or blades having screw threaded openings to receive the rods and having enlarged recesses in their outer edges, jam nuts on the outer ends of said rods in said recesses, inlet and outlet ports in said casing, all of said rods being in alinement in the same plane as the inlet and outlet ports, and one of said ports disposed radially whereby a screw-driver may be inserted through said radial port to turn the rods and adjust the vanes.

4. In a device of the character described, the combination with a cylindrical casing, of a shaft secured concentrically in the casing, a cylinder mounted eccentrically in the casing, means for turning the cylinder, said cylinder having longitudinal openings, the walls of which are curved, blades or vanes located in said openings, curved blocks at opposite sides of said vanes engaging the curved walls of said openings, rings around said shaft, screw threaded rods swiveled in said rings and having screw threaded engagement with said vanes, all of said rods being in the same plane and constructed to be operated from their outer ends, and said casing having inlet and outlet ports in the same plane as the rods, and one of said ports disposed radially whereby a screw-driver may be inserted through said radial port to turn the rods and adjust the vanes.

5. In a device of the character described, the combination with a casing, a shaft mounted concentrically in the casing, a cylinder mounted eccentrically in said casing, a shaft secured to and adapted to turn said cylinder, a series of radially disposed blades or vanes mounted in the cylinder and having their outer edges engaging the inner face of the cylinder, rings on said first mentioned shaft, said vanes and rings having alined recesses, pins in said recesses, screw threaded rods connected to said rings and having threaded engagement with said vanes, all of said rods being in the same plane and all of them having screw driver receiving grooves in their outer ends located in recesses in the edges of the blades or vanes.

6. In a device of the character described, the combination with a casing, of a shaft mounted concentrically in the casing, a cylinder mounted eccentrically in said casing, a shaft secured to and adapted to turn said cylinder, a series of radially disposed blades or vanes mounted in the cylinder and having their outer edges engaging the inner face of the cylinder, rings on said first mentioned shaft, said vanes and rings having alined recesses, pins in said recesses, screw threaded rods connected to said rings and having threaded engagement with said vanes, all of said rods being in the same plane and all of them having screw driver receiving grooves in their outer ends located in recesses in the edges of the blades or vanes, and said casing having inlet and outlet ports located in the same plane as the rods, and one of said ports disposed radially whereby a screw-driver may be inserted through said radial port to turn the rods and adjust the vanes.

7. In a device of the character described, the combination with a cylindrical casing, of a fixed shaft mounted concentrically in the casing, a cylinder mounted eccentrically in the casing, means for turning said cylinder, said cylinder having longitudinal openings, three blades or vanes located in said openings in the cylinder and engaging the inner face of the casing, three rings around the shaft, the outer rings having extensions projecting over the middle ring, said vanes and rings having alined recesses, pins in said recesses, rods having rotary mounting in said rings and screw threaded throughout the greater portion of their length, said vanes or blades having screw threaded openings to receive the rods and having enlarged recesses in their outer edges, jam nuts on the outer ends of said rods in said recesses, inlet and outlet ports in said casing, all of said rods being in alinement in the same plane as the inlet and outlet ports, and one of said ports disposed radially whereby a screw-driver may be inserted through said radial port to turn the rods and adjust the vanes.

8. In a device of the character described, the combination with a cylindrical casing, of a shaft secured concentrically in the casing, a cylinder mounted eccentrically in the casing, means for turning the cylinder, said cylinder having longitudinal openings, the walls of which are curved, blades or vanes located in said openings, curved blocks at opposite sides of said vanes engaging the curved walls of said openings, rings around said shaft, said vanes and rings having alined recesses, pins in said recesses, screw threaded rods swiveled in said rings and having screw threaded engagement with said vanes, all of said rods being in the same plane and constructed and operated from their outer ends and said casing having inlet and outlet ports in the same plane as the rods, and one of said ports disposed radially whereby a screw-driver may be inserted through said radial port to turn the rods and adjust the vanes.

In testimony whereof I have signed my name to this specification in the presence of two subscribing witnesses.

ARTHUR H. SQUIER.

Witnesses:
R. H. KREUKEL,
S. W. FOSTER.